(No Model.) 2 Sheets—Sheet 1.

D. WILSON.
MANUFACTURE OF TELEGRAPH AND OTHER POLES OR POSTS.

No. 374,103. Patented Nov. 29, 1887.

Witnesses:
J. A. Rutherford
Robt. Orcutt

Inventor:
David Wilson
By James L. Norris
Atty.

(No Model.) 2 Sheets—Sheet 2.
D. WILSON.
MANUFACTURE OF TELEGRAPH AND OTHER POLES OR POSTS.
No. 374,103. Patented Nov. 29, 1887.
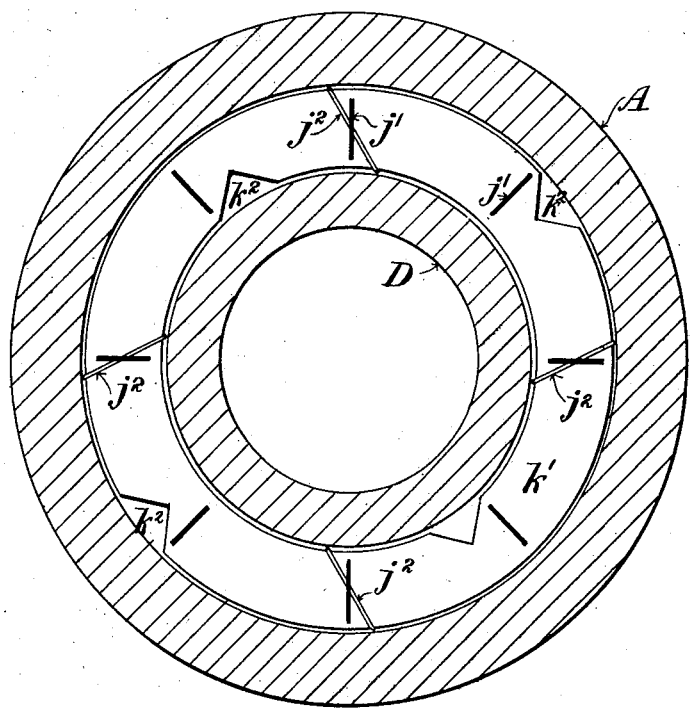
Fig. 11.
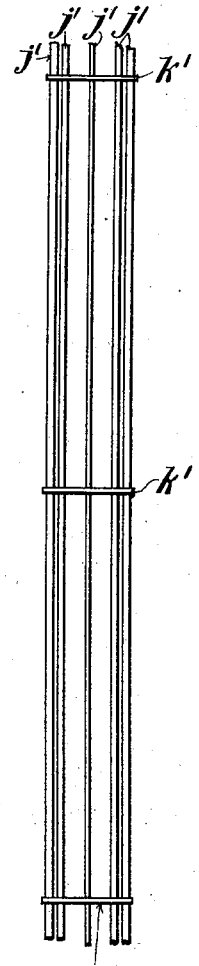
Fig. 12.
Fig. 14. Fig. 15.
 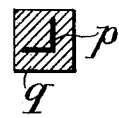
Fig. 13.
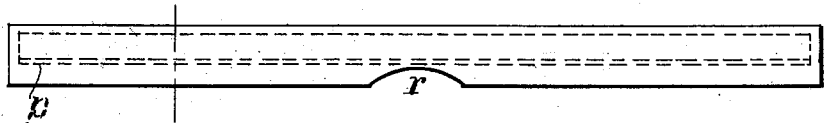
Witnesses
J. A. Rutherford
Robt. Everett
Inventor
David Wilson,
By James L. Norris,
Atty.

United States Patent Office.

DAVID WILSON, OF THE COUNTY OF ESSEX, ENGLAND.

MANUFACTURE OF TELEGRAPH AND OTHER POLES OR POSTS.

SPECIFICATION forming part of Letters Patent No. 374,103, dated November 29, 1887.

Application filed April 19, 1886. Serial No. 199,449. (No model.) Patented in England May 15, 1885, No. 5,990.

*To all whom it may concern:*

Be it known that I, DAVID WILSON, of the county of Essex, England, a subject of the Queen of Great Britain, have invented Improvements in the Manufacture of Telegraph and other Poles or Posts, (for which I have made application for Letters Patent in Great Britain, No. 5,990, dated 15th of May, 1885,) of which the following is a specification.

In manufacturing telegraph and other poles or posts I take a sheet of wire-netting and bend or roll it into a tube of the sectional form which the finished pole or post is required to have and of a diameter rather less than the required diameter of the finished pole or post, and within the said tube I place a mandrel, and I surround the said tube with a mold, which mandrel and mold are of a sectional form corresponding with that of the said tube, (which I will hereinafter refer to as the "core,") and are of such sizes that when placed as hereinbefore described spaces are left between them and the core, into which spaces I run concrete consisting of cement and sand or ground burnt clay mixed with water or with a solution of silicate of soda. By this means I produce a tube consisting of a core of metal coated both internally and externally with concrete.

The manufacture of telegraph-poles according to my invention is hereinafter fully described with reference to the accompanying drawings, Figure 1 being an elevation of the upper portion of a finished telegraph-pole about thirty feet long constructed according to my said invention, and Figs. 2 to 15 representing details of the manufacture.

The same letters and figures of reference indicate the same parts in each of the said figures.

Figure 4:
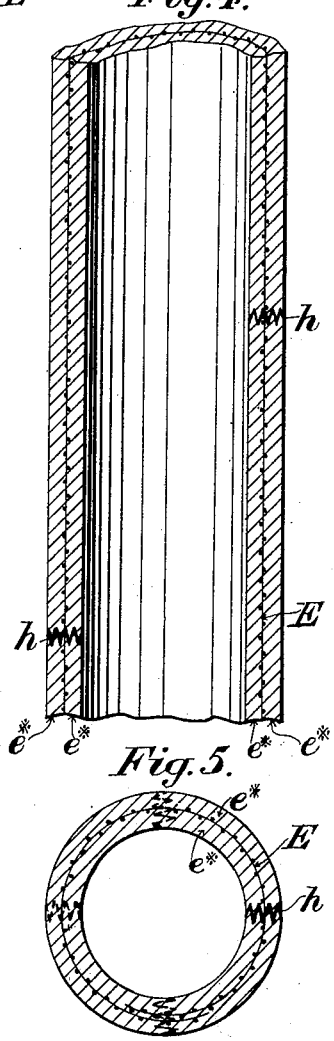
Figure 7:
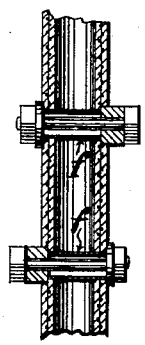
Figure 3:

In manufacturing a telegraph-pole according to my invention and by the use of the appliances hereinbefore described I take a piece of wire-netting of the length of the pole to be formed and of a width equal to the required circumference of the lower part of the pole, and I roll the said sheet into a taper tube, the edges of the sheet meeting at the larger end and overlapping at the smaller end. I then cast a mass of concrete upon said netting, completely inclosing the same, as seen in Fig. 4, the casting being done in any suitable mold. The pole when removed from the mold is open at both its upper and lower ends, and the wire core projects from the upper end, as shown at E, Fig. 2, which is an elevation of the upper portion of the pole as removed. The open upper end of the said pole I close by means of a cap of concrete formed as shown in section in Fig. 3, which cap I secure in place by passing the recess in its under side over the projecting end E of the wire core of the pole and running concrete or cement in a fluid state between them.

Figure 5:
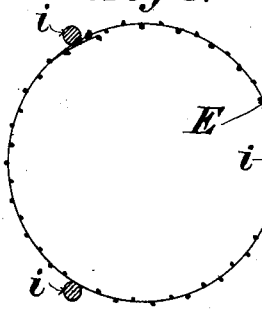

Fig. 4 is a longitudinal section of a portion of the finished pole, and Fig. 5 is a transverse section thereof, showing the position of the wire core in the concrete. In the said Figs. 4 and 5 the spiral wires are marked $h\,h$, the wire core E, and the concrete coatings of the said core $e^*\,e^*$.

Figures 6, 8:
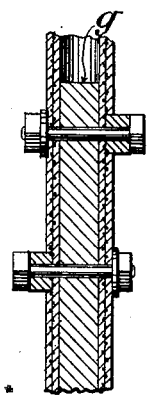

In order to secure to the pole the wooden arms or cross-bars which support the insulators, I form recesses in the pole (see Fig. 2) by any suitable means and drill holes in the parts where said recesses are formed, and I place the said arms in the recesses and pass screw-bolts through them and through the said holes and secure the said arms by screwing nuts on the said bolts. Fig. 6 of the accompanying drawings is a longitudinal section of a portion of a telegraph-pole to which the arms are secured, as hereinbefore described. In some cases I place metal tubes in the holes through which the bolts pass, which tubes bear the strain caused by screwing up the nuts on the said bolts. This arrangement is illustrated in section in Fig. 7, the tubes being marked $f\,f$; or, before closing the upper part of the tubular pole, as hereinbefore described, I place a plug of wood therein at the part where the arms are to be secured and drill the holes for the reception of the bolts through both the pole and the said plug. This arrangement is illustrated in section in Fig. 8, the plug of wood being marked $g$.

Figure 1:
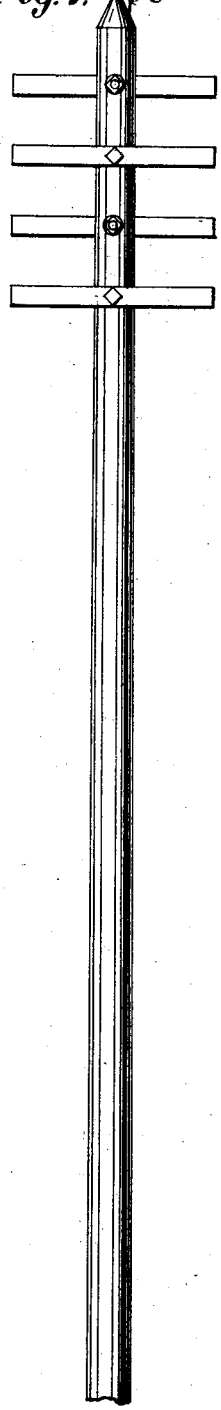
Figure 2:
Figures 9, 10:
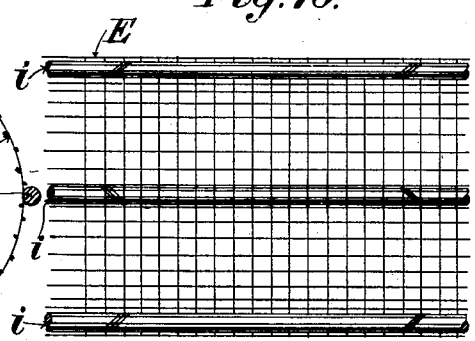

In providing telegraph-poles constructed, as hereinbefore described, with lightning-conductors, it is only necessary to connect to the upper part of the metal core a piece of wire of sufficient length to project some distance above the top of the pole, as shown at $c$ in Fig. 1 of the accompanying drawings.

Where it is desirable to increase the rigidity of the core, I secure metal rods longitudinally to the said core, as shown in Figs. 9 and 10, in which figures the said rods are marked $i$ $i$.

In some cases I form the core of a frame of metal bars or rods and hoops or rings, instead of wire-netting. A portion of a core thus formed in place in a mold and with the mandrel in place therein is shown in transverse section in Fig. 11, and a portion of the said core alone is shown in elevation in Fig. 12. Referring to the said figures, $j'$ $j'$ are metal bars, and $k'$ $k'$ are rings having slits formed in them, through which the said bars are passed. The outer and inner diameters of the said rings are respectively somewhat less than the inner and outer diameters of the mold and mandrel, and portions of the said rings are cut away, as shown at $k^2$ $k^2$, to allow the concrete to flow freely between them. $j^2$ $j^2$ are pins passed through holes formed in the bars $j'$ $j'$, which pins keep the hoops $k'$ $k'$ in place and keep the frame from contact with the mold. Cores thus formed may be used in place of cores of wire-netting for any of the manufactures herein described or referred to.

Cement alone may be used in all or any of the manufactures hereinbefore described in place of concrete. When I use cement alone, I make the coating of each side of the core about three-eighths of an inch thick in the case of poles and posts, and when I use concrete I make the coating on each side of the core about three-quarters of an inch thick. I, however, do not limit myself to any particular thickness of the coating.

The cement which I use in the manufactures herein described and referred to is Portland cement or other cement of similar nature and having similar properties. In preparing the cement for use I mix it with either water or a solution of silicate of soda or of silicate of potash or of caustic soda.

The concrete which I use in the said manufactures is prepared by mixing Portland cement or other like cement with either sea sand, river sand, slag-sand, or pit sand, or other sand or ground burnt clay—such as brick-bats or crushed or finely-disintegrated granite or other stone—and mixing the said matters either with water or with a solution of silicate of soda or silicate of potash or caustic soda. The said matters may be used in the following proportions, namely: cement, about one part by bulk; sand, about three parts by bulk; water or a solution of silicate of soda or silicate of potash or caustic soda, about one-tenth the joint weight of the cement and sand.

In some cases when I use water alone in the preparation of the cement or concrete, I soak the article when finished in a solution of silicate of potash or silicate of soda or caustic soda.

In cases where it is desirable to increase the strength of telegraph-poles and other poles or posts manufactured as hereinbefore described, which are not required to be hollow or tubular, I insert in the hollow thereof a wooden pole or post or a block of wood of suitable form, and run cement mixed with water into the interstices between the wooden pole or block and the inner side of the concrete or cement coating of the metal core of the article into which the pole or block is inserted, and over the ends of the said wooden pole or block. The wooden pole or block may be of the same length as or somewhat shorter than the finished pole or article is required to be.

In the case of poles or posts or other articles of moderate length, where blocks of wood or wooden poles sufficiently true in form may be conveniently obtained, I use such wooden blocks or poles in lieu of the mandrel before described—that is to say, I in such cases place the said blocks or poles in the required position within the core and cast the concrete or cement coatings on the core around the said blocks or poles, which are thus secured in place in the said articles.

In manufacturing insulator-arms for telegraph-poles according to my invention I take a bar of metal of about the length the arm is required to be and coat it with or embed it in cement or concrete. I prefer to use angle-iron, or steel or strips of sheet iron or steel bent longitudinally into an angular form, or strips of wire-netting similarly bent. Fig. 13 of the accompanying drawings is a plan, and Fig. 14 is an end elevation, of an insulator-arm thus manufactured; and Fig. 15 is a transverse section thereof, taken on the line A, Fig. 13. $p$ is the angle-iron. $q$ is the concrete or cement coating, and $r$ is a recess formed to fit the pole to which the arm is to be secured.

In manufacturing the said arms I place and support the metal core in the required position in a mold of suitable form and pour the concrete or cement into the mold and allow it to remain until the concrete or cement has set. I prefer to use angle-iron of the form shown in the said Fig. 15; but angle-iron of other form, or strips of sheet metal, or of wire-netting bent into other forms, may be used. When I use angle-iron or sheet-iron, I prefer to punch holes therein, and to leave the edges of the holes rough or jagged and projecting from the surface of the metal, in order to give the concrete or cement a good hold on the metal. I secure the insulators to the said arms, and I secure the arms to the poles by means of bolts passing through holes drilled through the said arms, or I form holes for the reception of the bolts at the required parts of the arms by placing plugs of wood in holes formed in the metal core and withdrawing the said plugs after casting the concrete or cement on the said core. The heads of the bolts may be countersunk and covered with concrete or cement, as hereinbefore described.

Having now particularly described and ascertained the nature of my said invention and in what manner the same is to be or may be performed, I would observe that I am aware that it has been proposed to construct tubes and other hollow articles of sheet metal either plain or corrugated and coated on one side or on both sides with plastic materials and concretes, the edges of the sheets being riveted together at the junctions. I am also aware that it has been proposed to construct tubes partly or entirely of sheet metal coated with asphaltum and rolled into a volute form. I am also aware that it has been proposed to use wire-netting in combination or in conjunction with cores of corrugated or fluted sheet metal in the manufacture of pipes from metal and concrete. Such methods of manufacture are, however, attended by disadvantages which do not attend the manufacture hereinbefore described, and I wish it to be understood that I make no claim to the manufacture of pipes and other articles according to the said proposed or known methods; neither do I limit myself to the precise details of the methods hereinbefore described of carrying my invention into effect, as the said details may be varied without departing from the nature of my said invention; but

I claim as my said invention—

1. A telegraph or other tubular pole composed of a skeleton of metallic rods or wires coated on both sides with cement, said pole being provided with one or more internal plugs or short cores, and bolts passing through both plug and tubular pole, substantially as described.

2. A tubular telegraph or other pole composed of a hollow cylinder molded upon a skeleton frame and strengthened by wooden blocks or plugs inserted at intervals in the interior of the tube, substantially as described.

3. A cross-arm for a telegraph-pole constructed of metal and Portland cement, substantially as described.

4. A telegraph or other pole composed of a skeleton frame, consisting of rods or bars $j'$ and hoops $k'$, engaging therewith at intervals, and a coating or body of cement inclosing said frame, substantially as described.

5. A telegraph-pole composed of a suitable tubular frame covered inside and out with cement, and having at intervals depressions or sockets formed in the outer coat of cement, in combination with a cross arm or support resting in said socket, and a bolt passing through said arm and past a nut turned on the end of said bolt, substantially as described.

6. An insulator-arm or cross arm for telegraph-poles, consisting of an angle-bar of metal inclosed in a body of Portland cement of suitable form, substantially as described.

7. A tubular pole composed of a skeleton frame inclosed in a tubular body of cement, in combination with a strengthening plug or core, a steadying-plate and a supporting-pin, substantially as described.

8. The combination, with a tubular telegraph pole or post constructed of a skeleton frame having an internal and external coating of cement or concrete, of internal strengthening pieces or blocks having apertures, bolts passing through said pole and internal pieces and carrying the telegraph-arms, and nuts turned upon said bolts and against the pole, substantially as described.

DAVID WILSON.

Witnesses:
WILLIAM THOMAS WHITEMAN,
    7 *Staple Inn, London.*
JOHN ALFRED DONNISON,
    71 *Cornhill, London.*